June 11, 1940.   C. R. COBURN   2,204,207
METHOD OF HANDLING MAGNETIZABLE PLATES AND APPARATUS THEREFOR
Filed April 18, 1938   2 Sheets-Sheet 1
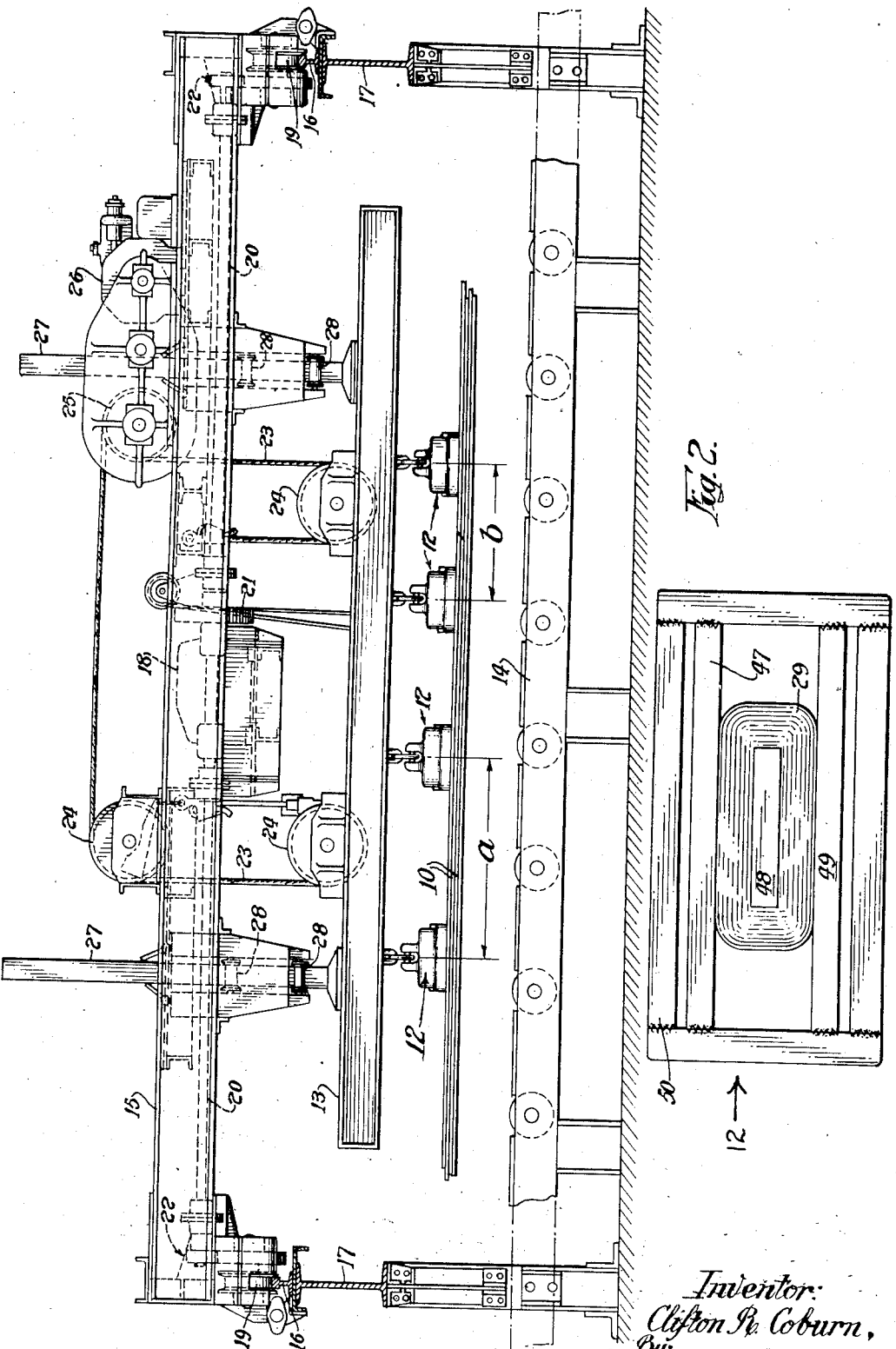
Inventor:
Clifton R. Coburn,
By:
Parker, Carson, Pitzner & Hubbard.
Attorneys Inventor:
Clifton R. Coburn, Patented June 11, 1940

2,204,207

UNITED STATES PATENT OFFICE 2,204,207

METHOD OF HANDLING MAGNETIZABLE PLATES AND APPARATUS THEREFOR

Clifton R. Coburn, Youngstown, Ohio, assignor to Manning, Maxwell & Moore, Inc., New York, N. Y., a corporation of New Jersey Application April 18, 1938, Serial No. 202,655

12 Claims. (Cl. 214—8.5)

The invention relates to an improved method of handling plates or sheets with a lifting magnet and to an apparatus particularly adapted to carry out the method.

One object of the present invention is to provide an improved method of operating a lifting magnet first to raise a group of plates or sheets from a stock pile and then to drop the plates one by one from the stack clinging to the magnet, as they may be required at some point of use above which the magnet may be located.

Another object of the invention is to provide an improved electromagnet lifting device of such character that the magnetic field of the device can be readily controlled to drop off individual successive ones of a plurality of plates or other articles clinging to it.

Further objects and advantages of the invention will become apparent as the following description proceeds taken in conjunction with the accompanying drawings in which:

Figure 1 is a front elevation of an electromagnet type plate handling mechanism adapted to carry out the method herein disclosed;

Fig. 2 is an enlarged bottom plan view of one of the lifting magnets included in the apparatus of Fig. 1;

Figure 3:
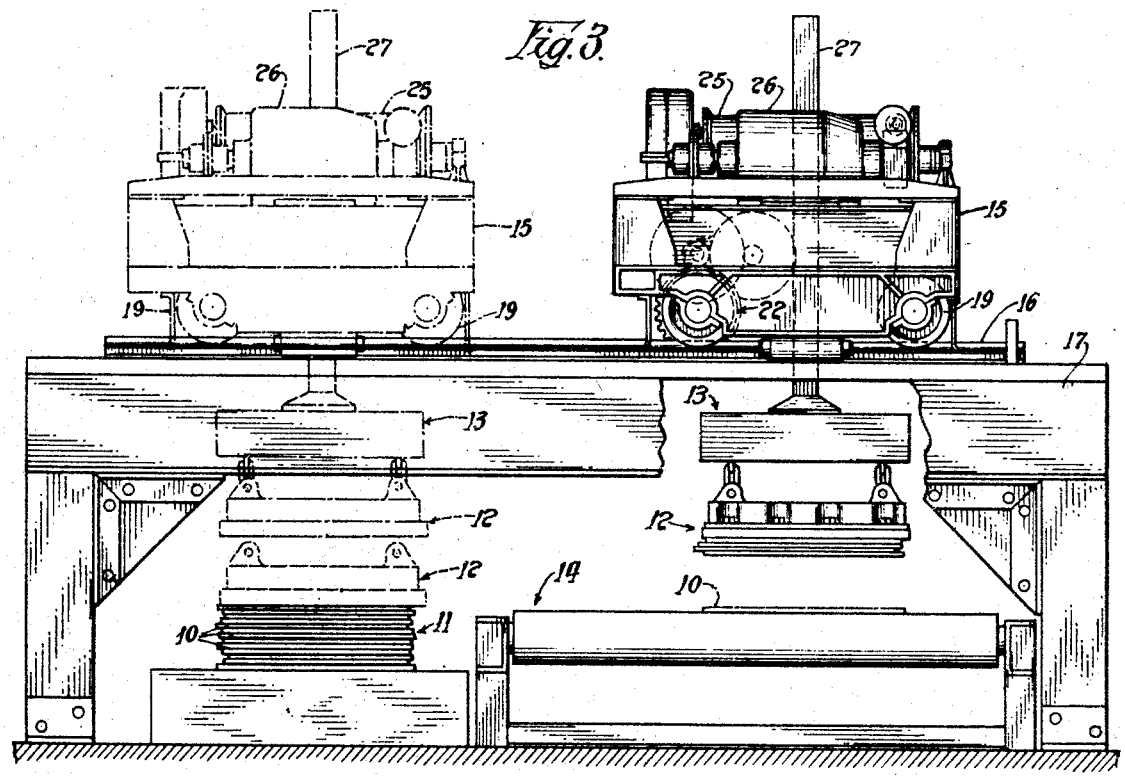
Fig. 3 is an end elevation of the machine shown in Fig. 1.

For purposes of illustration and explanation of its various novel features the invention has been shown herein as applied to the handling of sheets or plates 10 (Fig. 1) of magnetizable material such as sheet iron or sheet steel. In this application of the method herein contemplated the plates 10 are in general lifted in groups or stacks from a stock pile 11 (Fig. 3) by an electromagnetic lifting device shown as embodying four spaced electromagnets 12 (Fig. 1) carried by a horizontal beam 13. A particular spacing of the magnets is preferably utilized to facilitate handling of the plates as is hereinafter more particularly described. The lifted stack of plates is transferred to a point above a receiving station, such as the roller-type conveyer 14, and the magnetic field of the magnets is then controlled in a manner hereinafter set forth so as to drop off the plates one by one onto the conveyer. The individual plates may then be advanced along the conveyer to be operated on by a suitable processing mechanism such as a trimming shear or other plate shaping device (not shown). By this means the speed of operation of the associated plate shaping device is maintained at a maximum since the plates are fed to it as rapidly as its capacity permits, one after another along the conveyer 14.

For positioning of the magnets 12, the beam 13 is preferably made a part of a traveling hoisting mechanism. This mechanism has been shown herein as including a horizontal carriage or bridge 15 (Figs. 1 and 3) traversable along horizontal rails 16 carried by a suitable supporting framework 17. Traversing movement is imparted to the carriage 15 by a traversing motor 18 connected to rollers 19, which support the carriage on the rail 16. The motor is operatively connected to the rollers 19 through a pair of horizontal shafts 20 within the carriage, which are gear connected to the motor 18 as indicated at 21 and to the rollers 19 as indicated at 22. The beam 13 is suspended from the carriage 15 by cables 23 (Fig. 1) reeled over pulleys 24. Upon reeling the cables 23 in and out over a power actuated drum 25 driven by a hoisting motor 26, the magnet supporting beam is raised and lowered as desired. Such vertical movement of the beam 13 is guided by upstanding posts 27 fixed thereon and journaled in guide rollers 28 carried by the bridge 15.

Each of the electromagnets 12 preferably embodies a separate energizing winding 29 (Fig. 2) supplied with current from supply lines $L_1$—$L_2$ (Fig. 4) through the medium of an electrical control mechanism. This mechanism has been shown herein as being of the manually controlled type and embodies:—a rotatable drum-type controller designated generally by the numeral 30 and shown in developed form, a main reversing contactor or relay $S_1$ having a pair of normally open contacts $S_1C_1$—$S_1C_2$ and a pair of normally closed contacts $S_1C_3$—$S_1C_4$, a time-delay relay $S_2$ having contacts $S_2C_1$, and a pair of manually operable individual magnet control switches $S_3$ and $S_4$. The control apparatus also includes a tapped magnet control resistor $R_1$ governed by the controller 30, as well as current limiting resistors $R_2$—$R_3$—$R_4$. The main reversing switch $S_1$ serves in general to connect the magnets 12 to supply lines $L_1$—$L_2$ in series with the resistor $R_1$ and then successive portions of this resistor can be cut into or out of circuit by bridging the fixed contacts 31 with the cooperating movable contact 32 of the controller 30.

In the operation of the plate handling machine illustrated, the carriage 15 is traversed along the rails 16 in order to position it above the stock pile 11, as shown in dot-dash lines in Fig. 3. The beam 13 is then lowered so that the associated lifting magnets 12 are simultaneously positioned on top of the stock pile as indicated in dotted lines in Fig. 3. In order to energize the magnets 12 so that a stack of plates 10 will adhere to it, the controller 30 is shifted in the direction of the arrow marked "Lift" in Fig. 4 through the full distance of its path of movement. In the course of this movement, contacts plates 33—34, which are electrically connected by jumper 35, engage cooperating fixed contacts 36—37 so as to energize the main switch $S_1$ (through a circuit $L_1$—$R_3$—38—$S_2$—39—$S_1$—40—36—33—35—34—37—41—$L_2$). The simultaneous energization of the switch $S_2$ also closes its contacts $S_2C_1$ but that for the moment has no effect on the circuit since these contacts are in series with the now opened contacts $S_1C_4$. Closure of the main switch contacts $S_1C_1$ and $S_1C_2$ connects the magnets 12 in parallel relation across the supply lines $L_1$—$L_2$ and in series with the entire resistor $R_1$ (through a circuit $L_1$—$S_1C_1$—42—12—43—$S_1C_2$—44—$R_1$—$L_2$). As successive sections of the contact plate 32 bridge the fixed contact points 31, an increasing portion of the resistor $R_1$ is shunted so that the energizing current flowing through the magnets 12 is correspondingly increased. For example, when the first section $32^a$ of the contact plate 32 bridges the points $31^a$ and $31^b$ the lowermost section of the resistor $R_1$ is shunted out so that the magnets 12 are supplied with an increased current (through a circuit $L_1$—$S_1C_1$—42—12—43—$S_1C_2$—44—$R_1$—$31^b$—32—34—37—41—$L_2$). Successive portions of the resistor $R_1$ are shunted out by the succeeding stepped portions of contact plate 32. Finally, when the controller 30 is shifted to its full "lift" position, all of the resistor $R_1$ is shunted out and the magnets 12 are connected directly across the supply lines to receive a maximum energizing current (through a circuit $L_1$—$S_1C_1$—42—12—43—$S_1C_2$—44—32—34—37—41—$L_2$). With the magnets thus fully excited, they cause a plurality of the plates 10 to adhere to them in a stack. The number of plates picked up will, of course, vary according to their weight and thickness.

After the stack of plates has been attracted by the magnets 12 from the stock pile 11 (Fig. 3) the beam 13 and its attached magnets are hoisted by the motor 26 to the position shown in dot-dash lines in Fig. 3. The carriage 15 is then traversed to a point at which the magnets are positioned above the conveyor 14 (shown in full lines in Fig. 3). Various ones of the stack of plates picked up by the magnets may, if desired, be dropped at any one of several receiving stations rather than successively on a single receiving station.

The next step in the procedure is to drop the plates 10 one by one onto the conveyer 14 from the stack clinging to the magnets 12. To accomplish this it is necessary to decrease the effective magnetic field acting on the bottom plate of the stack to such an extent that the weight of this bottom plate will cause it to pull free and fall onto the conveyer. The term "effective field" is used with reference to all of the magnetic flux linking the plate whether it be due to residual magnetism or to the energizing current flowing at the moment, or to both. In practical operation, a number of factors complicate the procedure. For example, the weight of the plates, and hence the requisite decrease in field strength, will vary widely as different types of plates are handled. Also the field strength or magnetic attraction exerted on the plates varies not only with plates of different peripheral dimensions and thickness, but also with differences in their distances from the magnet. In other words, the attractive force exerted on the bottom plate of the stack clinging to the magnets will be substantially less than that exerted on the top plate of the stack. Moreover, the residual magnetism in the plates and magnet structure introduces a time-lag between decreases in magnet energizing current and decreases in the effective magnetic force exerted on the plates. On the other hand, the magnetic properties of the plates themselves, that is their retentivity and permeability, are widely variant for different materials but these same properties govern, to a large extent, not only the residual magnetism but also the energizing current required to set up a field of predetermined strength in a particular plate under even steady state conditions. In contrast with these numerous variable factors, many installations for plate handling equipment demand a high degree of precision as well as speed of operation. To inadvertently drop two plates instead of one and feed them simultaneously to a shear would, in many cases, cause the shear to be jammed or seriously damaged. Speed of plate handling, is however, equally requisite since slow plate movement slows down the whole line of associated machines and causes them to be worked at much below their full capacity.

I have discovered that the magnets can be controlled to give the desired type of rapid and high precision operation when manipulated in a special manner. In general, each successive plate is dropped individually by first decreasing the magnet energizing current to a point which would under steady state conditions be insufficient to support even the remainder of the stack after the bottom plate has dropped, and then when the bottom plate falls free, the current is increased to a value even greater than ordinarily required to hold the remaining plates. In the short interval between these two current changes, the remainder of the stack of plates is retained in position on the magnets by the residual magnetism in the plates which augments the effect of the momentarily decreased energizing current. By the term "steady state condition" reference is had to the strength and condition of the magnetic field which prevails after all transient effects of residual magnetism have disappeared subsequent to a change in the value of the energizing current.

In effect, the under-energization of the magnets compensates for the time-lag introduced by the residual magnetism so that the apparatus can be operated with a high degree of rapidity. In utilizing this method with the particular apparatus disclosed the controller 30 is shifted from its full "lift" position back two or three steps so that the first bottom plate in the stack quickly falls free. The controller is then immediately returned to its full "lift" position. When the operator is ready to drop the next plate he again turns the controller back several steps and when the second plate falls free, returns the controller to its full "lift" position. As the dropping of the plates progresses the return movement of the controller can be decreased somewhat. In other words, it is not necessary to apply again the full current to the magnets to support the remainder of the stack when only a few plates remain.

In some instances it is only necessary to increase the current in each case just sufficiently that the resulting steady state current will retain the remainder of the stack in position. This exact point is, however, hard to determine and accordingly it is safer and just as easy to deliberately over-energize the magnets each time. The improved method of operation described is advantageous from several standpoints. First of all, it does not require an exact calibration of the controller points for various thicknesses or types of plates since the operator need only roughly approximate the corresponding values of magnet energizing current. Since he is deliberately under-energizing and then over-energizing the magnets the only requisite is that the current value which will permit the bottom plate to fall free shall be bracketed between these under-energization and over-energization values. Furthermore, little or no preliminary calculation is required since the operator can move the controller 30 step by step to decrease the energizing current supplied to the magnet until the bottom plate falls free and then quickly return the controller to a position in which he can be assured that the remainder of the stack of plates will continue to cling to the magnets. A further virtue of this method of operation is that it can be carried out with a simple stepped-resistance type of controller for the magnets such as that illustrated herein.

Figure 4:
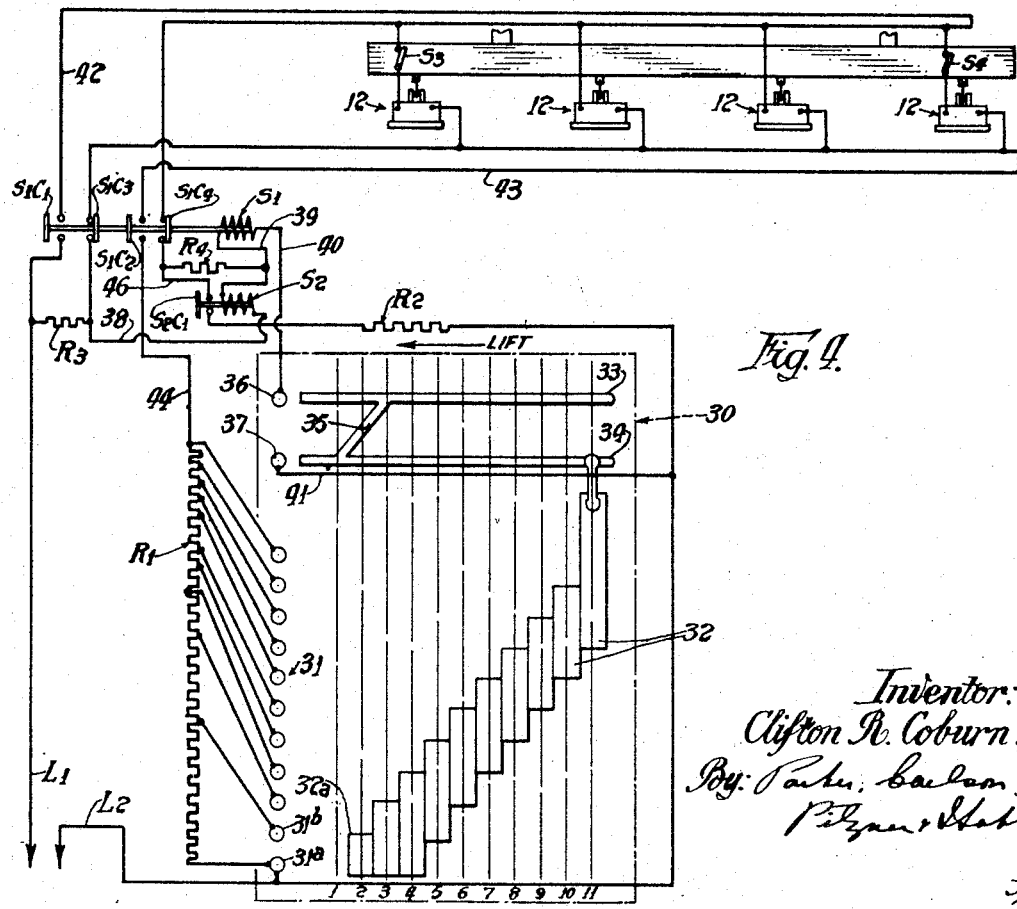
Fig. 4 is a wiring diagram of the control apparatus of the machine, together with a schematic representation of the associated parts.

After the last plate is dropped from the magnets 12 the controller is moved to its full "off" position shown in Fig. 4. As a result, the energizing circuit of the main reversing switch $S_1$ is opened at contacts 36—37 so that the switch contacts $S_1C_1$—$S_1C_2$ are opened. At the same time, the associated contacts $S_1C_3$ and $S_1C_4$ close to connect the magnets 12 to the supply lines $L_1$—$L_2$ in a reverse sense (through a circuit $L_1$—$R_3$—38—$S_1C_3$—43—12—42—$S_1C_4$—46—$S_2C_1$—$R_2$—$L_2$). The resistor $R_2$ limits the amount of current flowing through the magnets 12 to a comparatively low value when they are thus reversely connected. This reverse connection is finally interrupted, after a suitable short time interval, by the time-delay relay $S_2$. This relay is connected in shunt with the magnets and is energized in series with the resistor $R_4$ after the contacts 36—37 open so that the switch $S_2$ opens after its reduced energization supply decays to a point at which its contacts $S_2C_1$ fall to their normally open position. The effect of thus reversely energizing the lifting magnets 12 for a short interval of time is to eliminate any substantial amount of residual magnetism which would otherwise remain therein.

In order to facilitate operation of the magnets in accordance with the method described above, the controlling resistor $R_1$ is preferably divided into sections in such manner that in moving the controller 30 from its full "lift" position only small portions of resistance will be cut into the magnet circuits as compared to the size of the resistance sections cut in during the latter steps. In other words, in moving, for example, from step 11 to step 10 (Fig. 4) only a very small decrease in magnet energizing current is effected as compared to the change in moving from step 3 to step 2. As an example of the distribution of resistance between the various contact points 31, if the resistor $R_1$ has an overall resistance of eighteen ohms, the sections can advantageously be proportioned as indicated in the tabulation below:

| Step | Resistance change | Total resistance in magnet circuit |
|---|---|---|
| 1 | 0 | 18 |
| 2 | 8 | 10 |
| 3 | 3.5 | 6.5 |
| 4 | 2.0 | 4.5 |
| 5 | 1.2 | 3.3 |
| 6 | 0.8 | 2.5 |
| 7 | 0.6 | 1.9 |
| 8 | 0.5 | 1.4 |
| 9 | 0.5 | 0.9 |
| 10 | 0.5 | 0.4 |
| 11 | 0.4 | 0 |

With such a distribution of resistance in the successive steps the decrease in magnet current is comparatively small in the first few steps of the controller movement from full "lift" position. This makes the operation safer and also causes the current changes to approximate roughly that required for a stack of plates corresponding in number to the number of steps on the controller. As to safety, the operator has to move the controller a long distance (through several steps) before the magnetic field is cut down so far that several plates would be dropped at once, and consequently even if he is careless he is unlikely to move the controller so far that more than one plate will drop. As to approximation of field strength required, it is clear that the plate on the bottom of a stack clinging to the magnets is supported much less strongly than the top plate, in view of its greater distance from the magnets. Consequently a smaller decrease in energizing current is required to drop the bottom plate than to drop the top plate. It will be seen that the preferred controller resistance distribution also matches this latter requirement.

To further facilitate dropping of the plates one by one, the lifting electromagnets are preferably arranged in such manner that the plates will be freed from the stack with a peeling motion. This can be most easily accomplished with a special spacing of the magnets, such an arrangement being particularly useful in the event that the elongated sheets or plates are to be handled. In general, a lesser magnetic lifting force is applied to one end of the stack than to the other so that when the magnetic lifting force is simultaneously decreased in incremental steps at both ends, the bottom plate will at each step fall free first at said one end. By thus permitting one end of the bottom plate to pull free first it is "peeled" from the bottom of the stack and there is consequently less likelihood of dislodging the remainder of the suspended stack of plates. In the particular arrangement shown in Fig. 1, it will be noted that the two central magnets 12 are spaced comparatively close together. The magnet at the left-hand end of the stack is, however, spaced substantially further from these central magnets than is the magnet at the right-hand end of the stack. In other words, the dimension $a$ is substantially greater than the dimension $b$. These dimensions may, for example, be seven and one-half feet and five feet respectively. With such a distribution of the magnets along the length of the stack of plates 10, it will be seen that a lesser magnetic lifting force is utilized for supporting the left-hand end of the stack than the right-hand end portion of the stack, or to put it another way, the magnet at the left-hand of the beam 13 supports a substantially greater weight than do the other magnets. Consequently, when the energization of these several magnets is decreased simultaneously, in the manner previously described, in order to drop the plates one by one, the bottom plate will, in each case, pull free first at the left-hand end. After the sheet or plate has left the influence of the field of the electromagnet on the left end of the beam then all of the weight of the plate is supported by the electromagnet on the right end and will finally pull free from the stack. This latter action will take place readily even though the electromagnets on the right exert a magnetic attraction more than sufficient to hold the plate in position when the plate is also in the field of magnetic attraction at the left end of the beam. By thus causing the plates to drop from the stack with a peeling motion they can be freed singly with much less likelihood of inadvertently dislodging any of the other plates in the stack.

In the event that short plates are to be handled by the machine, one or both of the end magnets in the line can be disconnected by opening their associated switches $S_3$ and $S_4$ (Fig. 4). By this means the machine is readily conditioned for handling plates of any length which may be necessary.

While any suitable type of lifting magnet may be employed in the improved plate handling machine, the preferred form of magnet structure illustrated in Fig. 2 is particularly adapted for use in handling plates in the manner described. In general, the magnet 12 is of conventional three pole rectangular construction with the pole structure modified so as to distribute the magnetic flux in such manner that thin gauge sheets can be more readily dropped off one at a time. The magnetic pole structure is generally E-shaped in transverse cross section with the three legs 47—48—49 of the E forming downwardly facing poles. The energizing winding 29 surrounds the central leg 48. As a modification of this conventional three pole structure, a rectangular magnetic frame 50 is provided. This frame may be made of steel bars welded together in rectangular form. The frame and magnet structure are assembled with opposite side bars extending parallel to the legs. The said side bars are welded to the pole legs 47 and 49 and the frame thus constitutes an extension of the ordinary pole structure of the magnet. It will be seen that this additional frame serves to distribute the flux field over a greater area of the surface of a plate clinging to the magnet. As a result, the effects of residual magnetism in thin plates can be minimized.

It will be apparent from the foregoing that the invention provides a novel and advantageous method of and apparatus for handling large, unwieldy sheets or plates of thin material. Through the medium of the improved apparatus, the plates may be removed from a stock pile and transported to a receiving station in stacks and there released one by one as required. Thus, the rate at which the plates can be delivered at the receiving station is materially increased and, at the same time, the labor required for handling the same is reduced to a minimum. Moreover, the controls provided are of such character that accidental release of two or more plates simultaneously is avoided, thereby eliminating any danger to the workers or machines operating on the plates.

The improved plate handling machine is particularly suitable for use in delivering plates to a processing mechanism such as a trimming shear or other plate shaping device. It may also be used to advantage in the inspection and sorting of sheets or plates. Thus, a stack of plates may be lifted sufficiently to enable the inspector to examine first the bottom surfaces of the plates, and then as they are dropped off one by one, to examine the top surfaces thereof. Defective plates, when found, may be dropped on a separate pile, thereby carrying out the sorting operation in an efficient manner.

I claim as my invention:

1. The method of transferring magnetizable plates in groups from a stock pile and depositing them from the transferred group one by one at a desired delivery station or stations which comprises, positioning an electromagnetic lifting device on the top of the stock pile, energizing the device sufficiently to cause a plurality of the plates to cling to the device and to each other due to magnetic attraction, then positioning the device above a delivery station, intermittently decreasing the energizing current of the device in controlled varying amounts to free the plates one by one so that they drop off serially onto the delivery station above which the device is positioned, and after each such decrease in current again increasing the current supplied to the device sufficiently to retain the remainder of the plates in position thereon.

2. The method of handling magnetizable plates which comprises lifting a stack of such plates by causing them to cling by magnetic attraction to the bottom of an electrically energized magnetic lifting device, freeing the lowermost plate in the stack by decreasing the magnetizing current supplied to the device to a point at which the steady state electromagnetic field set up by it is less than that required to support the remainder of the plates after the bottom plate has dropped off, such magnetizing current being supplied in one direction to the device, then immediately increasing the current again after the bottom plate has dropped off and before any of the remainder of the plates have been freed by a dying out of the residual magnetism therein, and dropping the remainder of the plates one by one by similarly decreasing and increasing the current for the dropping of each successive plate.

3. The method of handling elongated magnetizable plates which comprises lifting a stack of such plates by exerting magnetic-attractive lifting forces on the stack of plates at spaced points along its upper surface but with a lesser force applied to one end portion of the stack than to the other, and then dropping the plates one by one with a peeling motion from said one end of the stack to the other by simultaneously decreasing in incremental steps the magnetic force applied at each of said points, the bottom plate being at each step pulled free by gravity with a peeling motion from said one end on which the lesser supporting force is exerted.

4. The method of handling elongated magnetizable plates which comprises lifting a stack of such plates by exerting a magnetic-attractive lifting force to the stack of plates at spaced points along its upper surface, with a lesser force applied to one end portion, and then dropping the bottom plate from the stack with a peeling motion from said one end to the other by decreasing the magnetic force applied to said one end portion of the stack.

5. The method of handling magnetizable plates which comprises causing a stack of such plates to cling by magnetic attraction to an electrically energized magnetic lifting device, and then dropping the plates singly but in each case dropping a plate through under and over-energization of the device as compared to the degree of energization required to retain the remainder of the stack suspended during steady state conditions, the magnetizing current being supplied in one direction to such lifting device.

6. The method of handling magnetizable plates which comprises causing a stack of such plates to cling by magnetic attraction to the bottom of an electrically energized magnetic lifting device, intermittently decreasing the energizing current supplied to the device below the amount necessary to support the remainder of the stack under steady state conditions even after the bottom plate has fallen free, the energizing current being supplied in one direction to the lifting device, and in each case again increasing the current sufficiently to retain the rest of the plates in position on the device after the bottom plate has fallen free in response to the decrease in current.

7. The method of handling magnetizable plates which comprises causing a stack of such plates to cling by magnetic attraction to the bottom of an electrically energized lifting magnet device, then quickly freeing the bottom plate only of the stack so that it falls free by gravity whenever desired by cutting down the energizing current supplied to the device to such an extent as to compensate for the time-lag effect of residual magnetism in the bottom plate and thereby cause the effective field linking it to be substantially simultaneously decreased to a point at which it is no longer sufficient to retain the bottom plate in position, and then quickly increasing the energization of the device as the bottom plate falls free so as to retain the remainder of the stack in position, the magnetizing current being supplied in one direction to the lifting magnet device.

8. The method of handling magnetizable plates which comprises picking up a stack of such plates simultaneously by an electromagnetic lifting magnet, and intermittently decreasing the mean value of the effective magnetic field linking said plates toward, but short of, a zero value though sufficiently to permit the lowermost plate in the stack to fall free under the force of gravity upon each such decrease in the field, and subsequently to each such decrease again increasing said field immediately after each such plate falls free to a mean value substantially in excess of that required to cause the remainder of the stack to cling to the magnet.

9. The method of handling magnetizable plates which comprises picking up a stack of such plates simultaneously by an electrically energized lifting magnet, and decreasing the energizing current supplied to the magnet in progressively increasing decrements to drop off the plates from the stack one by one.

10. The combination with a lifting electromagnet having an energizing winding, of means for connecting said winding to a source of current, and control means for varying step by step the current supplied to said winding in progressively increasing decrements from a maximum to a minimum value.

11. The combination with a lifting electromagnet having an energizing winding, of means for connecting said winding to a source of current, and control means for varying the current supplied to said winding non-uniformly from maximum to a minimum value.

12. In an apparatus for handling elongated flexible and magnetizable plates the combination of, means including a plurality of lifting magnets having electromagnetic energizing windings thereon and presenting a series of downwardly facing pole pieces in a common plane for suspending a stack of magnetizable plates caused to cling to the bottoms of said pole pieces by magnetic attraction, and means for simultaneously decreasing in incremental steps the energizing current supplied to each of said windings to drop the plates off one by one, said magnets being arranged in such manner as to apply a lesser lifting force to one end portion of the stack than to the other so that upon the simultaneous decrease in energization of said magnets the bottom plate will pull free due to gravity at said one end before the other end pulls free thereby causing the bottom plate to be separated from the stack by a peeling motion without dislodging the remainder of the stack.

CLIFTON R. COBURN.